United States Patent
Choe et al.

(10) Patent No.: US 9,465,815 B2
(45) Date of Patent: Oct. 11, 2016

(54) METHOD AND APPARATUS FOR ACQUIRING ADDITIONAL INFORMATION OF ELECTRONIC DEVICE INCLUDING CAMERA

(71) Applicant: Samsung Electronics Co., Ltd., Suwon-si, Gyeonggi-do (KR)

(72) Inventors: Seungyeon Choe, Suwon-si (KR); Jaehwan Lee, Suwon-si (KR); Chanil Byun, Mokpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/708,591

(22) Filed: May 11, 2015

(65) Prior Publication Data

US 2015/0341590 A1   Nov. 26, 2015

(30) Foreign Application Priority Data

May 23, 2014   (KR) .................. 10-2014-0062109

(51) Int. Cl.
*H04N 5/232* (2006.01)
*G06F 17/30* (2006.01)
*H04N 5/77* (2006.01)
(Continued)

(52) U.S. Cl.
CPC ......... *G06F 17/30265* (2013.01); *G06F 3/041* (2013.01); *G06K 9/00* (2013.01); *G06K 9/00302* (2013.01); *H04N 5/23219* (2013.01); *H04N 5/23222* (2013.01); *H04N 5/23293* (2013.01); *H04N 5/765* (2013.01); *H04N 5/772* (2013.01); *H04N 9/8205* (2013.01); *G06F 2203/011* (2013.01); *G06F 2203/04101* (2013.01); *G06F 2216/03* (2013.01); *G06K 2009/00328* (2013.01); *H04N 2201/3225* (2013.01); *H04N2201/3228* (2013.01); *H04N 2201/3229* (2013.01); *H04N 2201/3276* (2013.01)

(58) Field of Classification Search
CPC .......... H04N 5/23293; H04N 5/9201; H04N 5/2353; H04N 5/2254; H04N 5/772; H04N 5/765; H04N 5/23222; H04N 2201/3276; H04N 2201/3229; H04N 2201/3228; H04N 2201/3225; G06K 9/00302; G06K 2009/00328; G06F 3/041; G06F 17/30265; G06F 2216/03; G06F 2203/04101; G06F 2203/011

See application file for complete search history.

(56) References Cited

U.S. PATENT DOCUMENTS 7,669,135 B2\* 2/2010 Cunningham ........ G06F 3/0219
455/466
9,041,828 B2\* 5/2015 Kaneda .............. H04N 5/23219
348/222.1

(Continued)

FOREIGN PATENT DOCUMENTS

KR  10-2011-0086616 A   7/2011
KR  10-2012-0028491 A   3/2012

(Continued)

*Primary Examiner* — Luong T Nguyen
(74) *Attorney, Agent, or Firm* — Jefferson IP Law, LLP

(57) ABSTRACT

A method and an apparatus for acquiring additional information of an electronic device including a camera are provided. The method includes displaying a preview image when the camera is driven and collecting information and situation information about a subject, extracting shutter attribute information according to the collected information; displaying a shutter button corresponding to the shutter attribute information, and storing the preview image received from the camera, the situation information, and the shutter attribute information in response to a selection of a user for the shutter button.

20 Claims, 9 Drawing Sheets

(51) Int. Cl.
*H04N 5/765* (2006.01)
*G06F 3/041* (2006.01)
*H04N 5/225* (2006.01)
*G06K 9/00* (2006.01)
*H04N 5/92* (2006.01)
*H04N 5/235* (2006.01)
*H04N 9/82* (2006.01)

(56) References Cited

U.S. PATENT DOCUMENTS

| | | | |
|---|---|---|---|
| 2006/0015812 A1 | 1/2006 | Cunningham et al. | |
| 2008/0118100 A1* | 5/2008 | Hayashi | H04N 1/32112 382/100 |
| 2008/0240520 A1* | 10/2008 | Miyata | H04N 5/23219 382/118 |
| 2009/0087039 A1* | 4/2009 | Matsuura | H04N 5/232 382/118 |
| 2011/0289454 A1 | 11/2011 | Houllier et al. | |
| 2011/0317031 A1* | 12/2011 | Honda | H04N 5/23219 348/229.1 |
| 2012/0062766 A1 | 3/2012 | Park | |
| 2013/0151978 A1 | 6/2013 | Joo | |
| 2013/0242167 A1 | 9/2013 | Jung et al. | |

FOREIGN PATENT DOCUMENTS

| | | |
|---|---|---|
| KR | 10-2013-0057146 A | 5/2013 |
| KR | 10-2013-0104437 A | 9/2013 |

* cited by examiner

METHOD AND APPARATUS FOR ACQUIRING ADDITIONAL INFORMATION OF ELECTRONIC DEVICE INCLUDING CAMERA

CROSS-REFERENCE TO RELATED APPLICATION(S)

This application claims the benefit under 35 U.S.C. §119 (a) of a Korean patent application filed on May 23, 2014 in the Korean Intellectual Property Office and assigned Serial number 10-2014-0062109, the entire disclosure of which is hereby incorporated by reference.

TECHNICAL FIELD

The present disclosure relates to a method and an apparatus for acquiring additional information of an image photographed by an electronic device including a camera.

BACKGROUND

An electronic device is mounted with a camera to support collecting and storing an image for a subject according to control of a user. In addition, the electronic device may store additional information (metadata), for example, an aperture value, a brightness value, a color region, a date, a time, an exposure mode, an exposure time, a picture height, a picture width, horizontal resolution, and vertical resolution, about an image photographed through a camera function. Further, the electronic device may be provided so as to allow additional information (for example, information about a photographed place or a photographed person) to be input in addition to the aforementioned additional information.

However, in order to input additional information (for example, emotion information or comments, tag information about a subject) for a photographed image, the input of the additional information and the photographing of the image are not simultaneously performed, but a process of requesting a display of additional information about the photographed image and then inputting the additional information needs to be performed. That is, in order to input additional information other than mechanically input information, there is inconvenience in that a separate process from an image photographing process needs to be performed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus by which an electronic device is capable of simultaneously photographing an image and recording additional information about the image.

In accordance with an aspect of the present disclosure, a method for acquiring additional information of an electronic device including a camera is provided. The method includes displaying a preview image when the camera is driven and collecting information and situation information about a subject, extracting shutter attribute information according to the collected information, displaying a shutter button corresponding to the shutter attribute information, and storing the preview image received from the camera, the situation information, and the shutter attribute information in response to a selection of a user for the shutter button.

In accordance with another aspect of the present disclosure, an apparatus for acquiring additional information of an electronic device including a camera is provided. The apparatus includes a display unit configured to display a preview image, and a controller configured to collect information and situation information about a subject included in the preview image displayed on the display unit when the camera is driven, extract shutter attribute information according to the collected information, display a shutter button corresponding to the shutter attribute information, and store the preview image received from the camera, the situation information, and the shutter attribute information in response to a selection of a user for the shutter button.

The electronic device according to the embodiment of the present disclosure may simultaneously photograph an image, such as a picture and a video, without a separate post-processing process, and record additional information, thereby providing a user with convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
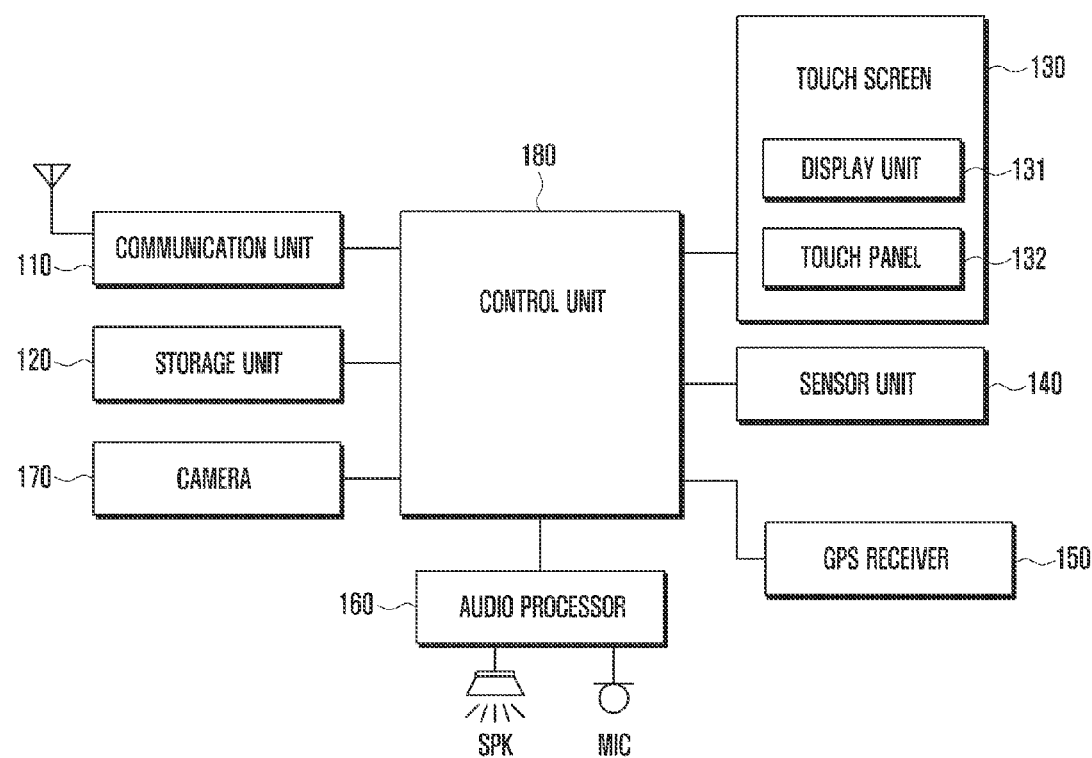
FIG. 1 is a block diagram illustrating a configuration of an electronic device including a touch device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "include" or "may include" refers to the existence of a corresponding function, operation, or element, and does not exclude one or more additional functions, operations, or elements. In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof.

Also, as used here, the expression "or" includes any or all combinations of words enumerated together. For example, the expression "A or B" may include A, may include B, or may include both A and B.

In the present disclosure, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first electronic device and a second electronic device indicate different user devices although both of them are user devices. For example, without departing from the scope of the present disclosure, a first structural element may be named a second structural element. Similarly, the second structural element also may be named the first structural element.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

Before the detailed description, it will be noted that the electronic device according to the present disclosure may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

A preview image in an embodiment of the present disclosure means an image displayed on a display unit through driving of a camera, to be disclosed below. Further, situation information in the embodiment of the present disclosure may include information (for example, expression information about a person, information received through a Social Networking Service (SNS) of a person, shared sensor information (for example, shared biosensor information (for example, body temperature sensor information and pulse sensor information for detecting a biometric signal of a person) of another electronic device (for example, a wearable device) connected to an electronic device when the subject is a person)) about a subject included in the preview image when the subject is a person, and/or surrounding situation information (for example, weather information, sound pulse information, noise information, and/or brightness information) about the electronic device.

Further, shutter attribute information in the embodiment of the present disclosure may mean a photographing mode extracted through an analysis of the situation information, and the photographing mode may include a photographing mode according to emotion information (for example, happy, sad, and excited), a photographing mode according to object information (for example, a person, a vehicle, and the sea). However, the shutter attribute information is not limited thereto. In the embodiment of the present disclosure, it is assumed that the shutter attribute information is emotion information for description. A parameter, which is a medium corresponding to the shutter attribute information, may be displayed while being reflected to a shutter button, and a user may visually confirm extracted emotion information through the shutter button to which the parameter is reflected.

FIG. 1 is a block diagram illustrating a configuration of an electronic device including a touch device according to various embodiments of the present disclosure.

Referring to FIG. 1, the electronic device of the present disclosure may include a communication unit 110, a storage unit 120, a touch screen 130, a sensor unit 140, a Global Positioning System (GPS) receiver 150, an audio processor 160, a camera 170, and a controller 180.

The communication unit 110 performs a voice call, a video call, or data communication with an external device through a network. The communication unit 110 may be configured with a Radio Frequency (RF) transmitter that up-converts and amplifies a frequency of a transmitted signal, and an RF receiver that low-noise amplifies a received signal and down-converts a frequency of the received signal. The communication unit 110 may include a modulator and a demodulator. The modulator/demodulator may include a Code Division Multiple Access (CDMA) modulator/demodulator, a Wideband CDMA (WCDMA) modulator/demodulator, a Long Term Evolution (LTE) modulator/demodulator, a Wi-Fi modulator-demodulator, a Wireless Broadband Internet (WiBro) modulator/demodulator, a Bluetooth (BT) modulator/demodulator, a Near Field Communication (NFC) modulator/demodulator, and the like. The communication unit 110 may be a mobile communication module, an Internet communication module, and/or a short-range communication module.

The storage unit 120 may include a program memory for storing an operating program of the electronic device, and a data memory for storing data generated during execution of a program.

Particularly, in an embodiment of the present disclosure, the storage unit 120 may store an image photographed through the camera 170, and also store situation information and shutter attribute information about the image as additional information (Exchangeable image file format (Exif)) within the image.

The touch screen 130 may be implemented as a one-body unit including a display unit 131 and a touch panel 132. Under the control of the controller 180, the display unit 131 may display various screen images according to the use of the electronic device. The display unit 131 may be formed of a Liquid Crystal Display (LCD), an Organic Light Emitted Diode (OLED), an Active Matrix OLED (AMOLED), a flexible display, a bended display, a Three-Dimensional (3D) display, and the like. In addition, the display unit 131 may be implemented to be flexible, transparent, or wearable. The touch panel 132 may be a complex touch panel including a hand touch panel for detecting a hand gesture and a pen touch panel for detecting a pen gesture.

Particularly, in an embodiment of the present disclosure, the display unit 131 may display a preview image under the control of the controller 180 when the camera 170 is driven. Further, the display unit 131 may control a shutter button for photographing the preview image to be displayed under the control of the controller 180. Here, the shutter button may be a shutter button to which a parameter (for example, an icon or an emoticon) corresponding to shutter attribute information extracted according to the situation information collected at a preview image display time is reflected.

The sensor unit 140 may detect a state change of a terminal varying according to an action of a user and an operation of the electronic device.

The sensor unit 140 may include a face recognizing sensor for detecting a face of a user, a luminance sensor for detecting surrounding luminance, a biometric sensor for detecting biometric information (for example, pulse and body temperature information) about a user, and the like.

The GPS receiver 150 may acquire current location information about the electronic device by receiving a GPS satellite signal.

The audio processor 160 is configured of a microphone MIC and a speaker SPK, and may convert an analog voice signal input from the microphone MIC into a digital voice signal and output the converted digital voice signal to the speaker SPK. Further, the audio processor 160 may output various other audio signals generated by the electronic device through the speaker SPK.

The audio processor 160 may receive and acquire surrounding noise information about the electronic device through the microphone MIC when the camera 170 is driven under the control of the controller 180.

The camera 170 performs a function of photographing a subject and outputting the photographed subject to the controller 180. The camera 170 may include a lens for collecting light, an image sensor for converting light received from the lens into an electric signal, and an image signal processor for processing the electric signal input from the image sensor into low data and outputting the processed low data to the controller 180.

The controller 180 controls an overall operation of the electronic device and a signal flow between internal elements of the electronic device, processes data, and controls the supply of power from a battery to the elements.

The controller 180 may control the display unit 131 to display a preview image when the camera 170 is driven. Further, the controller 180 may analyze information about a subject included in the preview image and/or a weighted value assigned to situation information collected through the sensor unit 140, and extract shutter attribute information through a combination of the analyzed weighted values. The display unit 131 is controlled by the controller 180 so as to display a shutter button to which a parameter corresponding to the shutter attribute information is applied. When a user selects the shutter button, that is, a photographing demand is generated, the controller 180 may store the image received from the camera 170, the situation information, and the shutter attribute information together.

In an alternative embodiment, the electronic device may further include elements having additional functions, such as a broadcasting receiving mode for receiving broadcasting and an input unit for supporting a hard-key based input, but a description and illustration of the elements having the functions will be omitted.

Figure 2:
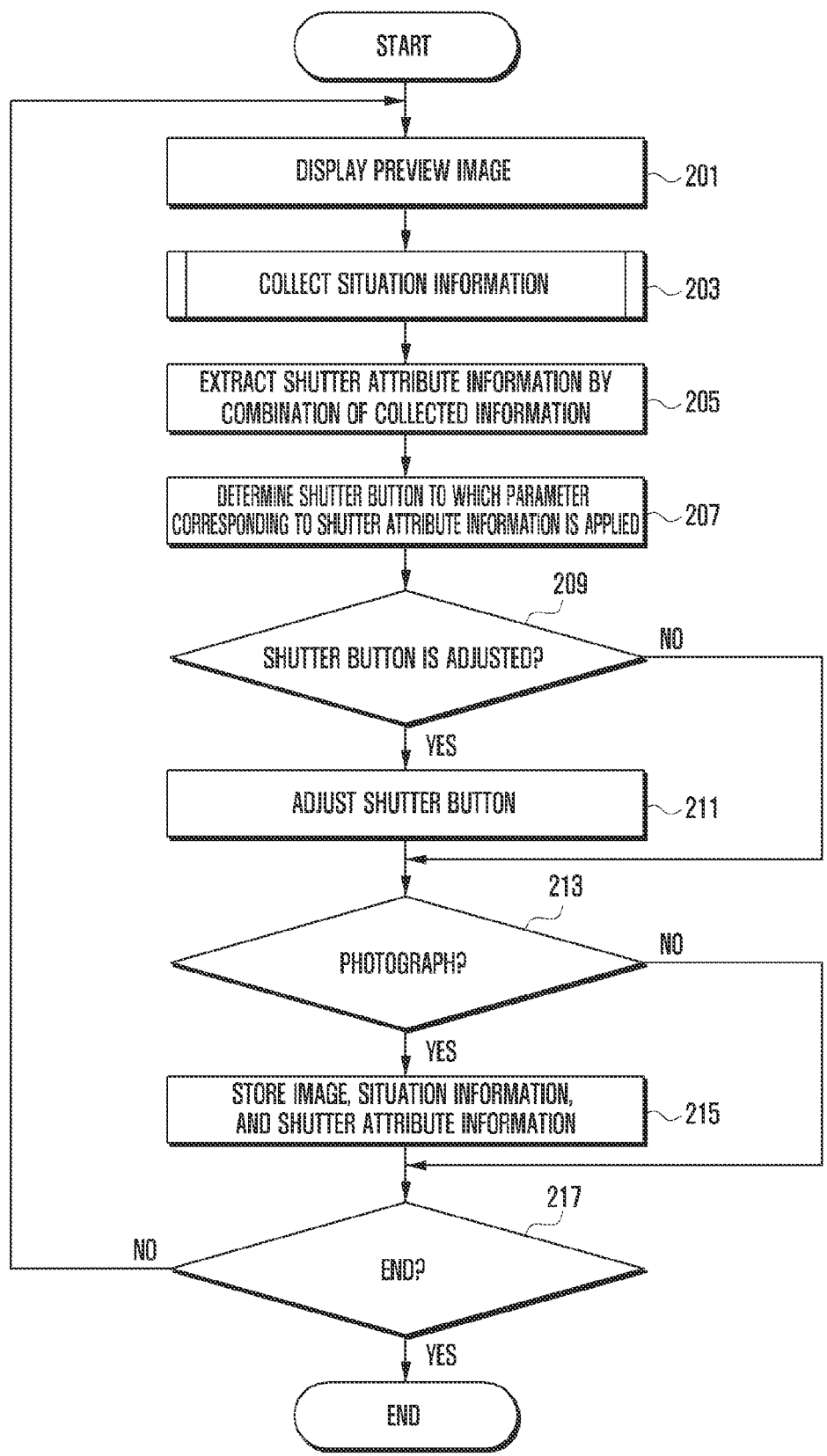
FIG. 2 is a flowchart illustrating a method of acquiring additional information according to various embodiments of the present disclosure.

FIG. 2 is a flowchart illustrating a method of acquiring additional information according to various embodiments of the present disclosure.

Referring to FIG. 2, in operation 201, the controller may control the display unit to display a preview image. Here, the preview image means an image displayed on the display unit through driving of the camera. The controller may collect situation information at a time of the display of the preview image in operation 203. The collected situation information may include information about a subject included in the preview image and/or surrounding situation information about the electronic device, for example, weather information about a corresponding location acquired by receiving location information through the GPS receiver, beat and/or noise information about a sound received through the audio processor, and brightness information detected by a luminance sensor. Particularly, the subject may be a person or may not be a person according to an embodiment of the present disclosure.

When the subject is a person, the information about the subject may include facial expression information about the person, shared sensor information (for example, pulse sensor information) of another electronic device, e.g., a wearable device, connected with an electronic device used by the person, and information received through an SNS of the person.

When the subject is not a person, for example, an object, the information about the subject may include information about the subject, for example, a vehicle, the sea, and a mountain.

Figure 3:
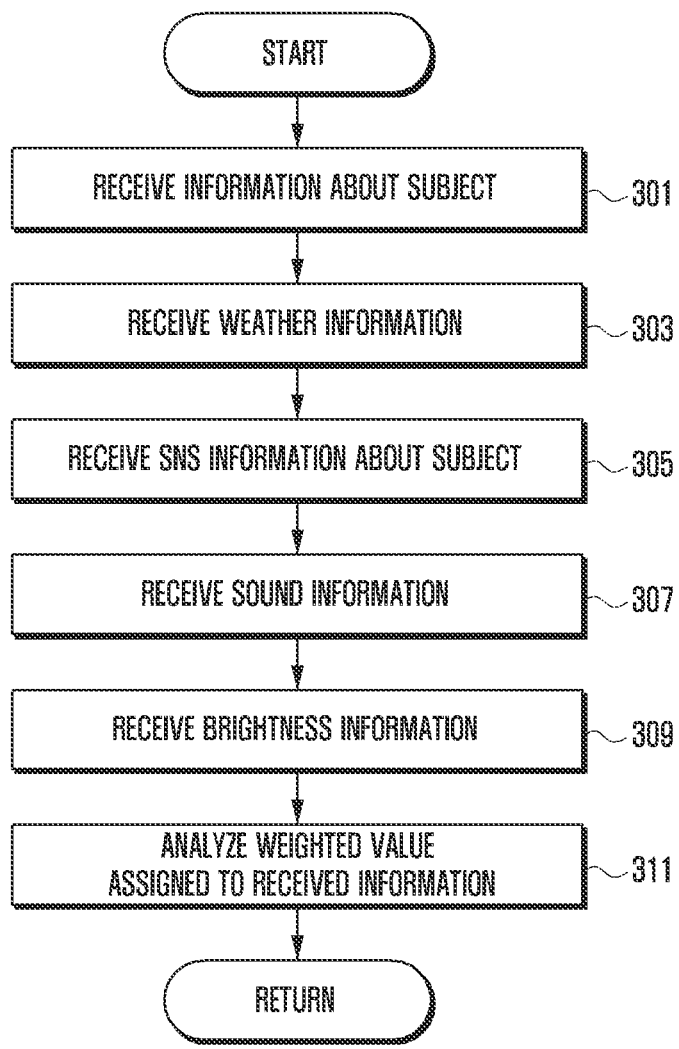
FIG. 3 is a flowchart illustrating a configuration of collecting situation information in order to extract shutter attribute information according to various embodiments of the present disclosure.

Operation 203 illustrated in FIG. 2 will be described in detail with reference to FIG. 3. FIG. 3 is a flowchart illustrating a configuration of collecting situation information according to various embodiments of the present disclosure.

Referring to FIG. 3, the controller may receive information about a subject in operation 301. The controller may acquire location information from the GPS receiver and confirm weather information about the location in operation. The controller may receive SNS information about the subject in operation 305. Particularly, when the subject is a person, the controller 180 may receive SNS information connected to the person (for example, emotion information registered in the SNS). The controller may also receive sound information through the audio processor in operation 307. For example, the sound information may include beat and/or noise information of a sound. Next, the controller may detect a brightness degree through the luminance sensor in operation 309.

In the embodiment of the present disclosure, the controller may receive the one or more pieces of information through operations 301 to 309, and perform an operation of analyzing weighted values assigned to the received situation information in operation 311. Different weighted values may be assigned to the respective situation information, or the weighted value may be graded and assigned based on situation information which a user considers important. For example, a weighted value assigned to a subject is 0.4, a weighted value assigned to weather information is 0.2, a weighted value assigned to brightness information is 0.1, a weighted value assigned to sound information is 0.1, and a weighted value assigned to SNS information is 0.2, and a large weighted value may be assigned to situation information to be considered important in order to determine shutter attribute information.

Referring back to FIG. 2, the controller may combine the analyzed information about the subject and the weighted value of the situation information, and extract shutter attribute information in operation 205. The shutter attribute information may be determined according to the subject. When the subject is a person, the shutter attribute information may be emotion information, for example, happy, said, and excited. When the subject is not a person, that is, the subject is an object, the shutter attribute information may be object information, for example, a vehicle, the sea, a mountain, trip, and a dog). But the shutter attribute information, though, is not limited to those listed above.

The extracted shutter attribute information may then be corrected based on accumulated shutter attribute information. Particularly, the shutter attribute information, for example, the shutter attribute information determined by the controller and/or the shutter attribute information determined by an adjustment of a user, determined according to the situation information may be accumulated and stored. When situation information, which is the same as, or similar to, the previous situation information, is generated later, the controller may analyze a stored history and extract shutter attribute information according to the analyzed history.

The controller may determine and display a shutter button, to which a parameter corresponding to the extracted shutter attribute information is applied, in operation 207. The parameter, which is a medium corresponding to the shutter attribute information, may be displayed while being reflected to the shutter button, and a user may visually confirm extracted emotion information through the shutter button to which the parameter is reflected. The controller may determine whether the shutter button is adjusted in operation 209. For example, an operation of adjusting the shutter button may be adjusting the shutter button to a shutter button desired by the user when the shutter button of the parameter determined according to the situation information is not emotion information desired by the user.

When the shutter button is adjusted, the controller may adjust the shutter button in operation 211. After the operation of adjusting the shutter button is performed, or when the operation of adjusting the shutter button is not generated in operation 209, the controller may determine whether to photograph the preview image with the determined shutter button in operation 213. When a photographing demand is generated, for example, a user's selection for the shutter button is input, the controller may photograph the preview image and simultaneously store the photographed image, and situation information and shutter attribute information about the image together in operation 215.

Situation information and shutter attribute information fields may be generated in additional information Exif within the image and the situation information and the shutter attribute information may be recorded and stored. The present disclosure is not limited thereto, and the situation information and the shutter attribute information may also be stored in a format, in addition to the additional information Exif. The controller may determine whether to terminate the operation in operation 217. When a termination command is generated, the controller may terminate the driving of the camera. However, when the termination command is not generated, the controller may return to operation 201, and control the display unit to display a preview image.

Figure 4:
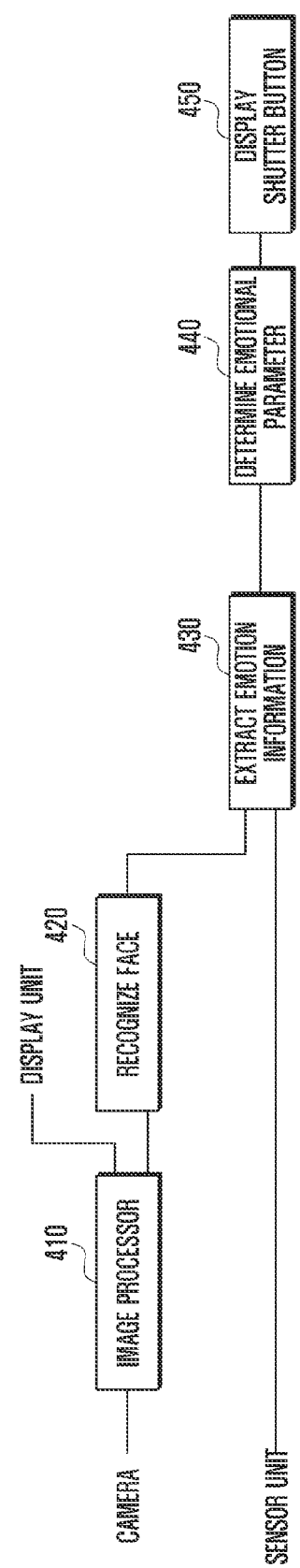
FIG. 4 is a diagram illustrating a configuration of processing an image according to various embodiments of the present disclosure.

FIG. 4 is a diagram illustrating a configuration of processing an image according to various embodiments of the present disclosure.

Referring to FIG. 4, an image processor 410 processes an image signal output from the camera into a digital image, and pre-processes and post-processes image data. The image processor 410 may include an image pre-processing/post-processing unit, a scaler for generating an image (hereinafter, a display image) obtained by scaling an image with a set display size of the display unit, and/or a codec for compressing and encoding image data. Next, a face recognizing operation is performed based on the image processed by the image processor 410 in operation 420, and position information and size information about the eyes and/or the mouth in the face may be obtained by the face recognizing operation.

The controller may extract emotion information by analyzing the obtained position information and size information about the eyes and/or the mouth in the face in operation 430. For example, when the facial expression is determined as a smiling expression through the analysis of the obtained position information and size information about the eyes and/or the mouth in the face, the controller may extract the emotion information of "happy".

Otherwise, the controller may extract emotion information according to shared sensor information. For example, a pulse rate detected by a pulse sensor, or another electronic device (for example, a wearable device) connected with the electronic device. The controller may also analyze surrounding situation information about the electronic device received through the sensor unit, the GPS receiver, and the audio processor and extract emotion information. The controller may analyze the emotion information extracted through the facial expression and the emotion information extracted through the situation information, and determine final emotion information in operation 440. The controller 180 then determines and displays a shutter button corresponding to the extracted emotion information in operation 450. In the embodiment of the present disclosure, when a touch event is generated in the shutter button, the controller may photograph the image, and simultaneously store the photographed image and the emotion information about the image.

Figure 5:
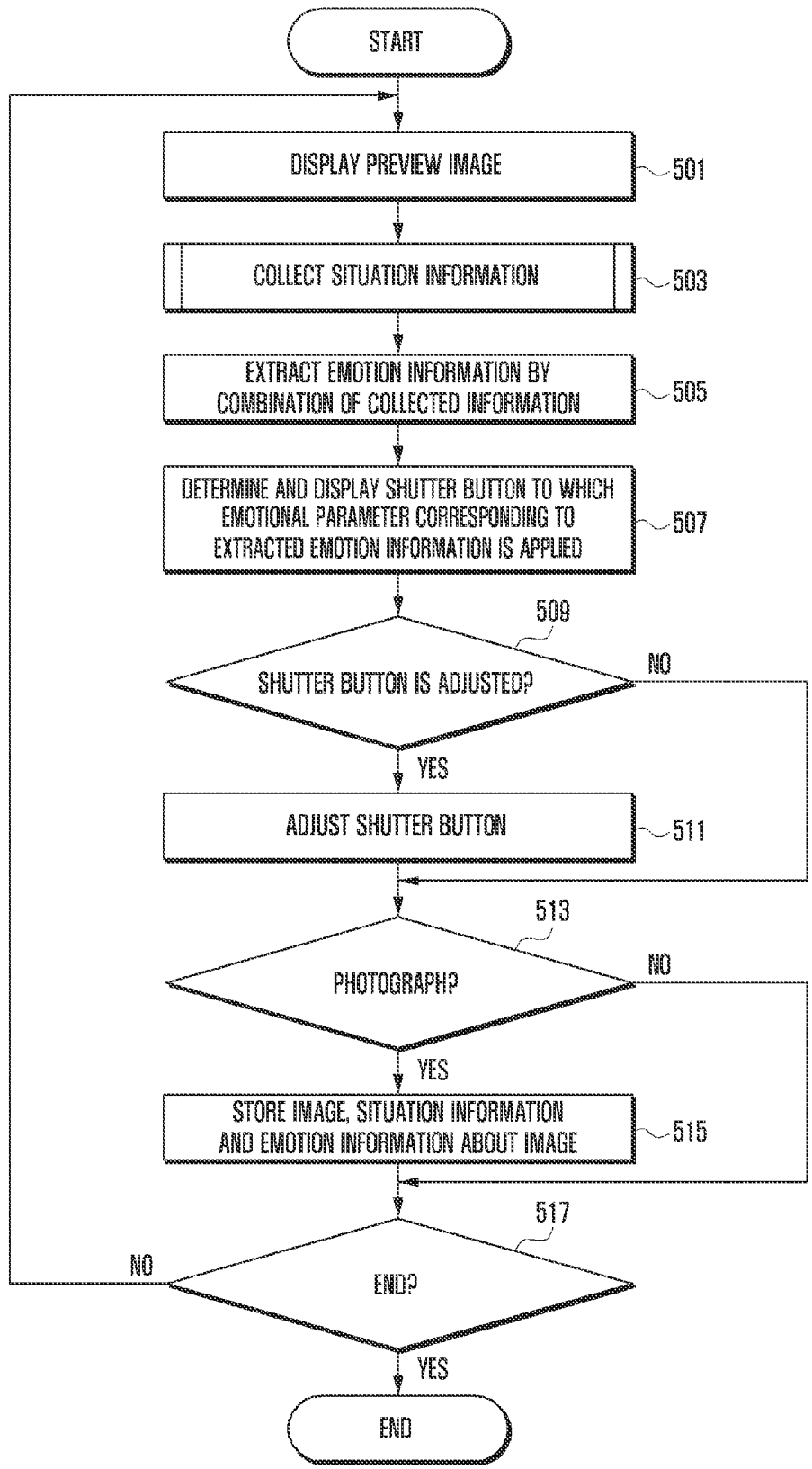
FIG. 5 is a flowchart illustrating a method of acquiring additional information according to various embodiments of the present disclosure.

FIG. 5 is a flowchart illustrating a method of acquiring additional information according to various embodiments of the present disclosure. In the disclosed example, the shutter attribute information is emotion information Referring to FIG. 5, the controller may collect information about a subject (i.e., a person) included in a preview image displayed on the display unit through driving of the camera and/or situation information at a display time of the preview image and extract emotion information. Further, the controller 180 may determine and display a shutter button to which an emotional parameter corresponding to the extracted emotion information is applied.

In operation 501, the controller may control the display unit to display a preview image. Here, the preview image means an image displayed on the display unit when the camera is driven. Next, the controller may collect situation information at a display time of the preview image in operation 503. The collected situation information may include information, e.g., expression information about a person and information received from an SNS of a person about a person included in the preview image, and/or surrounding situation information, e.g., weather information about a corresponding location acquired by receiving location information through the GPS receiver, beat and/or noise information about a sound received through the audio processor, and brightness information detected by the luminance sensor about the electronic device.

Figure 6:
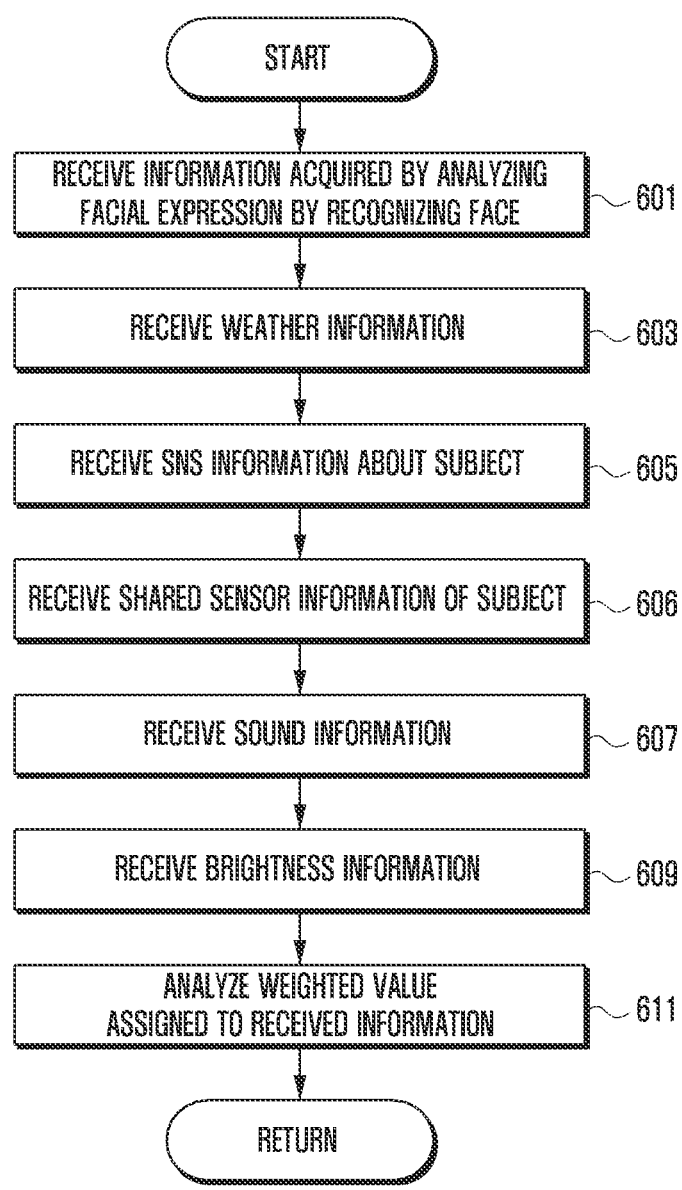
FIG. 6 is a flowchart illustrating a configuration of collecting situation information in order to determine shutter attribute information according to various embodiments of the present disclosure.

Operation 503 illustrated in FIG. 5 will be described in detail with reference to FIG. 6. FIG. 6 is a flowchart illustrating a configuration of collecting situation information in order to determine shutter attribute information according to various embodiments of the present disclosure.

Referring to FIG. 6, the controller may receive information about a subject in operation 601. Particularly, the controller may recognize a face of a person in the preview image acquired through the camera, and acquires position information and size information about eyes and/or a mouth on the face. The controller may then extract emotion information about the person by analyzing a facial expression through the acquired information.

Further, the controller may acquire location information through the GPS receiver and confirm weather information about the location in operation 603. The weather information may include sunny, cloudy, rain, snow, and the like. The emotion information, e.g., happy and sad, may be extracted according to the weather information.

SNS information about the person is received by the controller in operation 605. The controller receives SNS information when an SNS of the person displayed on the preview image is connected. For example, the SNS information may include emotion information registered in the SNS, and when a plurality of pieces of emotion information is registered, the controller may receive recently registered emotion information. The controller may receive shared sensor information, for example, a pulse sensor information, of another electronic device, a wearable device, connected with an electronic device used by the person in operation 606. When a pulse rate is fast based on the shared pulse sensor information, the controller may extract emotion information, for example, "excited" or "satisfied", according to the pulse rate. When a pulse rate is slow based on the shared pulse sensor information, the controller may extract emotion information, for example, "calm" or "tired", according to the pulse rate.

The controller may receive sound information through the audio processor in operation 607. The sound information may include a noise degree and noise beat information about a photographed place. For example, when it is determined that a noise degree is large and/or a noise beat period is short through the sound information, the controller may extract emotion information, for example, "excited" or "satisfied", according to the determination. When it is determined that a noise degree is small and/or a noise beat period is long through the sound information, the controller may extract emotion information, for example, "calm" or "tired", according to the determination.

The controller may also detect a brightness degree through the luminance sensor in operation 609. The controller may extract emotion information, for example, "happy", "sad", or "gloomy", according to a brightness or dark degree detected through the luminance sensor.

In the embodiment of the present disclosure, the controller may receive one or more pieces of information through operations 601 to 609, and analyze a weighted value for the one or more pieces of received information in operation 611. Different weighted values may be assigned to the respective situation information, or the weighted value may be graded and assigned based on situation information which a user considers important.

Referring back to FIG. 5, the controller may combine weighted values of the analyzed situation information and extract emotion information in operation 505. In the embodiment of the present disclosure, example emotion information may include emotions listed in Table 1.

TABLE 1

| Category | Term |
| --- | --- |
| Pleasure | Pleased, happy, glad, delighted |
| Excitement | Excited, astonished, delighted, aroused |
| Arousal | Aroused, angry, alarmed, tense, astonished |
| Distress | Distressed, afraid, frustrated, annoyed |
| Misery | Miserable, gloomy |
| Depression | Depressed, gloomy, sad, bored |
| Sleepiness | Tired, sleepy, droopy, bored |
| Contentment | Satisfied, content, calm, relaxed, at ease, serene |

For example, when a weighted value for a subject is 0.4 and emotion information is happy, a weighted value for weather information is 0.2 and emotion information is sad, a weighted value for brightness information is 0.1 and emotion information is sad, a weighted value for sound information is 0.1 and emotion information is happy, and a weighted value for SNS information is 0.2 and emotion information is happy, the controller may analyze the emotion information according to the assigned weighted values and extract the emotion information of "happy". The numerical value of the weighted value is one example, and the weighted value is not limited thereto.

The controller may determine and display a shutter button, to which an emotional parameter corresponding to the emotion information extracted in operation 505 is applied, in operation 507. Here, the shutter button, to which the emotional parameter is applied, may be a button to which an icon and an emoticon corresponding to the emotion information are applied.

The controller may then determine whether the shutter button is adjusted in operation 509. For example, an operation of adjusting the shutter button may be adjusting the shutter button to a shutter button of the emotional parameter desired by the user when the emotion information determined according to the situation information is not emotion information desired by the user.

When the shutter button is adjusted, the controller may detect the adjustment of the shutter button in operation 509 and adjust the shutter button in operation 511. Next, after the operation of adjusting the shutter button is performed, or when the operation of adjusting the shutter button is not generated in operation 509, the controller may determine whether to photograph an image in operation 513. When a photographing demand is generated, the controller may store the photographed image and the situation information and the emotion information about the photographed image together in operation 515. Situation information and shutter attribute information fields may be generated in additional information Exif within the image and the situation information and the shutter attribute information may be recorded and stored.

It should be noted that the situation information and the shutter attribute information may also be stored in a format in addition to the additional information Exif. Then, the controller may determine whether to terminate the operation in operation 517. When a termination command is generated, the controller may terminate the driving of the camera. However, when the termination command is not generated, the controller may return to operation 501, and control the display unit to display a preview image.

Figure 7A:
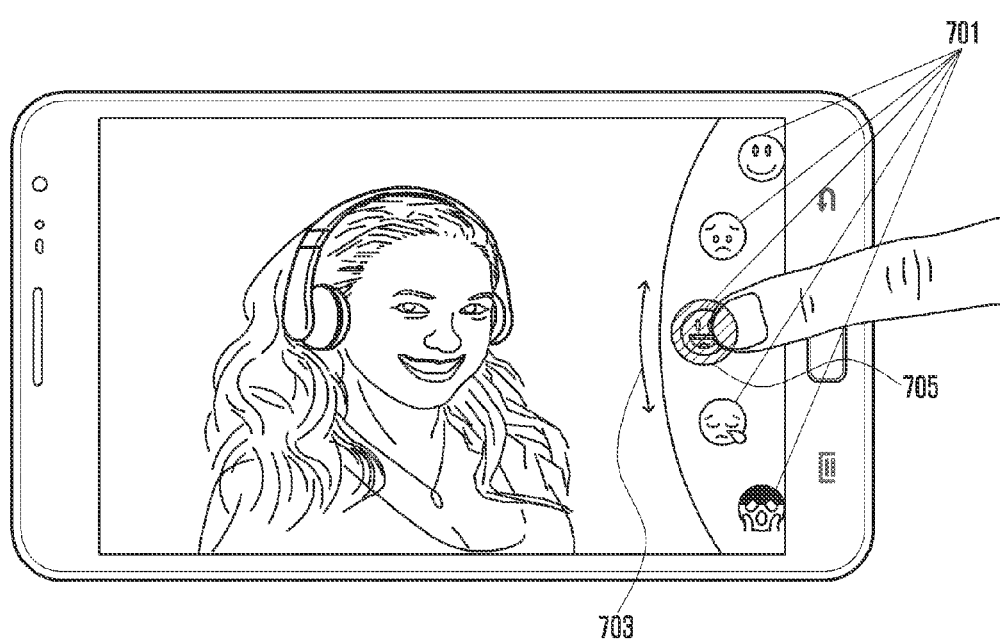
FIGS. 7A and 7B are diagrams for describing a method of acquiring additional information according to various embodiments of the present disclosure.
Figure 7B:
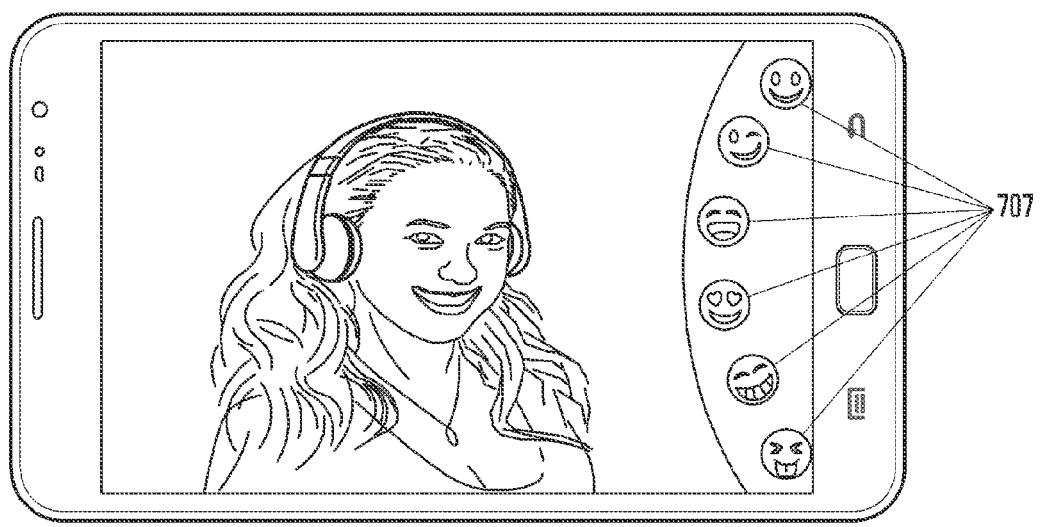

FIGS. 7A and 7B are exemplary diagrams for describing a method of acquiring additional information according to various embodiments of the present disclosure.

Referring to FIGS. 7A and 7B, reference numeral 701 of FIG. 7A denotes shutter buttons to which emotional parameters corresponding to extracted emotion information are applied. When an event is generated in the shutter button, emotion information corresponding to an emotional parameter may be stored together with an image. Further, one or more shutter buttons 701 may be vertically adjusted as denoted by reference numeral 703.

When a preview image including a person is displayed on the touch screen through driving of the camera as illustrated in FIG. 7A, the controller may acquire position information and size information about eyes and/or a mouth of a person in the preview image and analyze a facial expression. The controller may extract emotion information through the analyzed facial expression. For example, the controller may determine the facial expression as a smiling expression through the analysis of the facial expression of the person included in the preview image as illustrated in FIG. 7A, and thus extract emotion information of "happy".

The controller may extract weather information about a corresponding region at a display time of the preview image, surrounding brightness information, surrounding sound information, and emotion information about a person, and/or shared sensor information, e.g., pulse sensor information of another electronic device, e.g., a wearable device, connected with the electronic device. The controller 180 extracts final emotion information based on the extracted information and may display the shutter button, to which the emotional parameter corresponding to the extracted emotion information is applied, in a center region as denoted by reference numeral 705.

As described above, when the emotion information of "happy" is extracted, the controller may display a "happy" shutter button corresponding to the emotion information of "happy" in the center region. When a photographing event is generated in the displayed "happy" shutter button, the controller may store the emotion information of "happy" and the situation information together with the photographed image. In the embodiment of the present disclosure, the emotion information of "happy" and the situation information may be recorded in additional information Exif within the image.

Otherwise, the emotional parameter for the emotion information of "happy" may be displayed with various kinds of emotional emoticons as denoted by reference numeral 707, illustrated in FIG. 7B, and thus, a user may widely apply emotion information for the image by utilizing the various emoticons.

Figure 8:
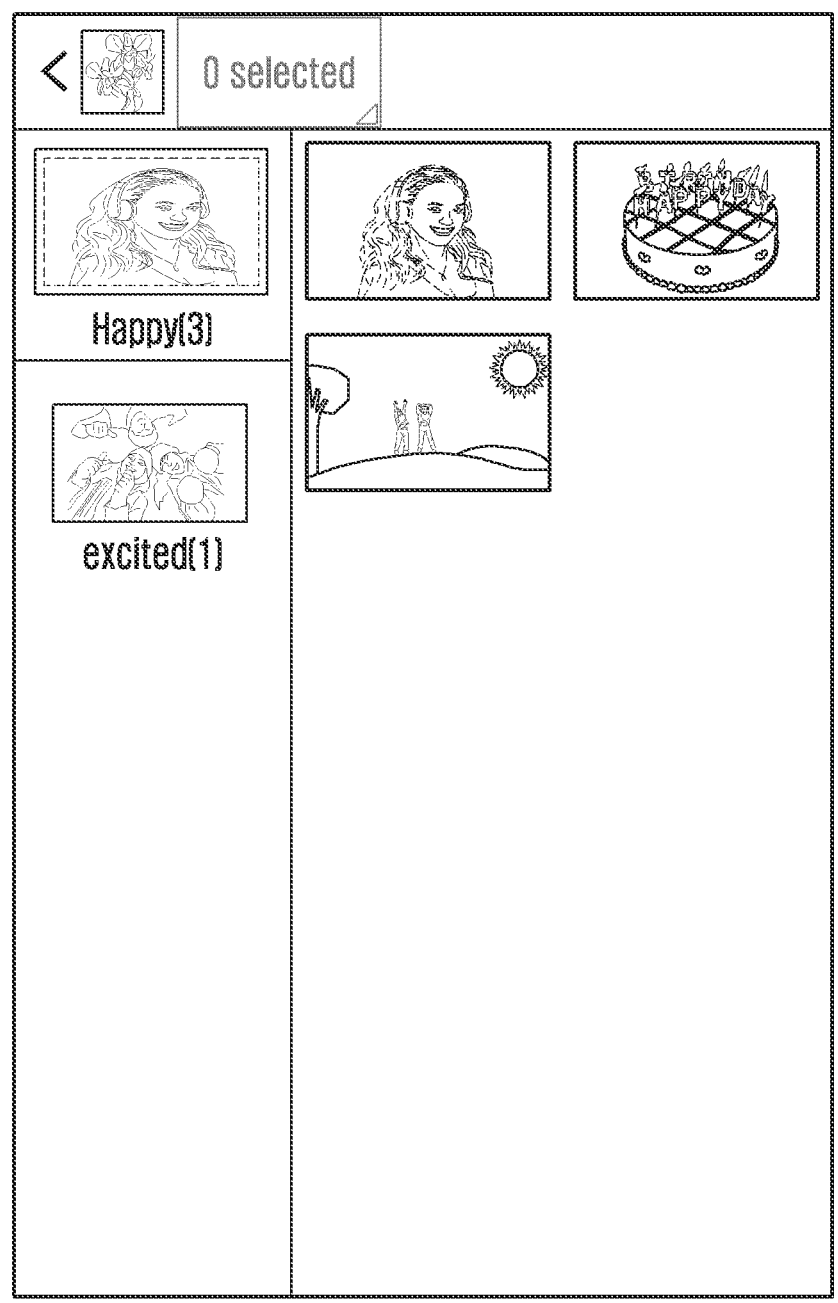
FIG. 8 is a diagram of a case where a stored image is displayed according to shutter attribute information according to various embodiments of the present disclosure.

FIG. 8 is a diagram of an example case where a stored image is displayed according to shutter attribute information in accordance with various embodiments of the present disclosure.

Referring to FIG. 8, the photographed image obtained by photographing the image may be classified based on emotion information and stored in a gallery. Particularly, the controller may generate a folder according to the emotion information about the photographed image in the gallery, and store the photographed image in the generated folder. In the embodiment of the present disclosure, when a folder according to emotion information is previously generated, the controller may store the photographed image in a folder mapped to emotion information about the photographed image. For example, when a "happy" folder is generated, the image, from which the emotion information of "happy" is extracted, may be classified into and stored in the happy folder. Then, a user may view the images, to which the emotion information of "happy" is reflected, through the happy folder stored in the gallery.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for acquiring additional information of an electronic device including a camera, the method comprising:
    displaying a preview image when the camera is driven and collecting information and situation information about a subject;
    extracting shutter attribute information according to the collected information;
    displaying a shutter button corresponding to the shutter attribute information; and
    storing the preview image received from the camera, the situation information, and the shutter attribute information in response to a selection of a user for the shutter button.

2. The method of claim 1, wherein the situation information and the shutter attribute information are stored in a field separately generated in additional information Exchangeable image file format (Exif) of the image received from the camera.

3. The method of claim 1, wherein the shutter attribute information is extracted according to at least one of a weighted value assigned to the information and the situation information about the subject.

4. The method of claim 3, wherein the situation information includes at least one of a piece of weather information at a display time of the preview image, brightness information, sound information, Social Networking Service (SNS) information about the subject, and shared sensor information of the subject.

5. The method of claim 1, wherein the displaying of the shutter button includes adjusting the shutter button when the adjustment of the shutter button is detected and displaying the adjusted shutter button.

6. The method of claim 1, wherein the storing includes storing the preview image received from the camera in at least one of a gallery and a folder according to the shutter attribute information.

7. The method of claim 1, wherein when the subject is a person, the shutter attribute information is emotion information, and when the subject is an object, the shutter attribute information is object information.

8. The method of claim 7, wherein when the shutter attribute information is emotion information, the shutter button according to the emotion information is displayed by analyzing at least one of a facial expression of the person, SNS information about the person, and shared sensor information of the person.

9. The method of claim 7, wherein when the shutter attribute information is object information, the shutter button according to the object information is displayed.

10. The method of claim 8, wherein the shutter button is a button to which at least one of an icon and an emoticon corresponding to the shutter attribute information is applied.

11. An apparatus for acquiring additional information of an electronic device including a camera, the apparatus comprising:
a display unit configured to display a preview image; and
a controller configured to:
collect information and situation information about a subject included in the preview image displayed on the display unit when the camera is driven,
extract shutter attribute information according to the collected information,
display a shutter button corresponding to the shutter attribute information, and
store the preview image received from the camera, the situation information, and the shutter attribute information in response to a selection of a user for the shutter button.

12. The apparatus of claim 11, wherein the controller generates a field for the situation information and the shutter attribute information in additional information Exchangeable image file format (Exif) of the preview image received from the camera and stores the situation information and the shutter attribute information.

13. The apparatus of claim 11, wherein the controller extracts the shutter attribute information according to a weighted value assigned to at least one of the information and the situation information about the subject.

14. The apparatus of claim 13, wherein the controller collects at least one of a piece of situation information among weather information at a display time of the preview image, brightness information, sound information, Social Networking Service (SNS) information about the subject, and shared sensor information of the subject.

15. The apparatus of claim 11, wherein the controller adjusts the shutter button when the adjustment of the shutter button is detected and controls the display unit to display the adjusted shutter button.

16. The apparatus of claim 11, wherein the controller stores the preview image received from the camera in at least one of a gallery and a folder according to the shutter attribute information.

17. The apparatus of claim 11,
wherein, when the subject is a person, the controller determines that the shutter attribute information is emotion information, and
wherein, when the subject is an object, the controller determines that the shutter attribute information is object information.

18. The apparatus of claim 17, wherein when the shutter attribute information is emotion information, the controller analyzes at least one of a facial expression of the person, SNS information about the person, and shared sensor information of the person, and controls the display unit to display the shutter button according to the emotion information.

19. The apparatus of claim 17, wherein when the shutter attribute information is object information, the controller controls the display to display the shutter button according to the object information.

20. The apparatus of claim 18, wherein the controller displays the shutter button to which at least one of an icon and an emoticon corresponding to the shutter attribute information is applied.

* * * * *